United States Patent
Williams et al.

[11] Patent Number: 5,881,296
[45] Date of Patent: Mar. 9, 1999

[54] METHOD FOR IMPROVED INTERRUPT PROCESSING IN A COMPUTER SYSTEM

[75] Inventors: Steven D. Williams, Portland; Philip Martin, Banks, both of Oreg.

[73] Assignee: Intel Corporation, Santa Clara, Calif.

[21] Appl. No.: 725,297

[22] Filed: Oct. 2, 1996

[51] Int. Cl.$^6$ .............................. G06F 9/46; G06F 13/14
[52] U.S. Cl. .......................................... 395/736; 395/742
[58] Field of Search .................................. 395/733, 735, 395/736, 741, 742, 309, 200.54, 200.55, 200.61, 200.62, 200.67, 200.78, 200.8, 868, 869, 870

[56] References Cited

U.S. PATENT DOCUMENTS

| | | | |
|---|---|---|---|
| 5,404,536 | 4/1995 | Ramakrishman et al. | 395/733 |
| 5,440,690 | 8/1995 | Rege et al. | 395/200.2 |
| 5,522,039 | 5/1996 | Snyder et al. | 395/185.05 |
| 5,530,874 | 6/1996 | Emery et al. | 395/735 |
| 5,533,203 | 7/1996 | Fischer et al. | 395/250 |
| 5,613,129 | 3/1997 | Walsh | 395/740 |
| 5,659,758 | 8/1997 | Gentry et al. | 395/733 |
| 5,675,807 | 10/1997 | Iswandhi et al. | 395/733 |
| 5,708,814 | 1/1998 | Short et al. | 395/733 |
| 5,708,817 | 1/1998 | Ng et al. | 395/739 |

*Primary Examiner*—Meng-Ai T. An
*Assistant Examiner*—Raymond N Phan
*Attorney, Agent, or Firm*—Blakely, Sokoloff, Taylor & Zafman LLP

[57] ABSTRACT

A method and apparatus for reducing the number of interrupts issued by a first device to a second device in a computer system. A delay interval is specified to the first device, the delay interval indicating an amount of time for the first device to wait after receiving data from the second device before issuing an interrupt to the second device. The first device issues the interrupt immediately after receiving the data from the second device when the specified delay is zero. When the delay is non-zero, the first device is scheduled to interrupt the second device after the delay interval expires. If a second unit of data is received from the second device before the delay interval expires, the scheduled interrupt is canceled. Otherwise, the interrupt is issued immediately after the delay interval expires.

4 Claims, 3 Drawing Sheets

METHOD FOR IMPROVED INTERRUPT PROCESSING IN A COMPUTER SYSTEM

BACKGROUND

1. Field of the Invention:

The invention relates to the field of interrupt processing in a computer system, and more particular to the field of high-interrupt environments.

2. Art Background:

In a computer system, the processor may be interrupted by other components in the system upon the occurrence of certain events. For example, a network adapter in a computer system may interrupt the processor when a packet of data is received. The network adapter may also interrupt the processor after successfully transmitting a unit of data, so that the processor may free any resources associated with the data (buffers, for example). The processor services the interrupt by reading the received data or freeing the associated resources and then clearing the interrupt. Typically, clearing the interrupt also involves enabling the interrupting device to generate another interrupt, if and when the event re-occurs.

The servicing of interrupts is usually a high priority for the processor. Therefore, when interrupts are generated at a high rate, the processor may become 'interrupt bound'. An interrupt bound processor spends most or all of its time servicing interrupts, and as a consequence the processor does not have time to do lower-priority tasks, such as running programs. A processor is likely to become interrupt bound when operating in 'high traffic' environments. A high traffic environment is one in which many units (packets) of data are sent and/or received in a short period of time. In high traffic environments, a peripheral device which interrupts the processor every time a packet is received or transmitted may monopolize the processor's time. To prevent monopolization of the processor by an interrupting peripheral device, it is desirable to reduce the number of interrupts associated with sending and receiving data with the peripheral device. However, reducing the number of interrupts must not result in lost data. For example, it is not acceptable to simply ignore interrupts if that means ignoring the data associated with those interrupts.

As mentioned above, network adapters use interrupts to notify the processor when packets (units of data) are received from or transmitted to the network. A typical prior art method used by a network adapter to handle the receipt of packets from a network is as follows:

1) read a packet from the network into the memory of the network adapter;
2) transfer the packet from the memory of the network adapter to the memory of the computer system using Direct Memory Access (DMA); and
3) interrupt the processor to indicate that a packet is ready for processing.

In response to the interrupt in step 3 above, the processor invokes software with instructions to process the received packet. This software is commonly referred to as an interrupt service routine (ISR). The ISR typically performs the following operations:

4) temporarily disabling further interrupts from the network adapter to prevent the network adapter from interrupting the processor while the ISR is processing the packet, which prevents re-entrancy problems;
5) resetting the host-side interrupt hardware, which on computer systems using Intel™ architecture compatible processors involves sending an end-of-interrupt (EOI) signal to the Programmable Interrupt Controller (PIC) (resetting the host-side interrupt hardware allows for the receipt of another interrupt from the network adapter for another packet, once interrupts for the adapter are re-enabled);
6) processing the received packet, which typically involves reading the packet from the memory (note that if more packets were written to the memory during steps 4 and 5 above, the ISR may for efficiency reasons process the additional packets before returning this has ramifications which are discussed below);
7) re-enabling interrupts from the network adapter; and
8) returning control from the ISR to the software which was being executed before the interrupt occurred, which on systems using Intel architecture processors typically involves the execution of an IRET instruction.

One problem with the method discussed above occurs when the ISR processes additional packets which were received via DMA or before the ISR received control. After step 5, the processor is ready to receive another interrupt from the network adapter. The writing of the additional packets to the memory using DMA would normally result in an interrupt from the network adapter. However, to prevent re-entrancy into the ISR, interrupts from the network adapter are disabled in step 4 from reaching the processor. Thus, writing the additional packet(s) to memory using DMA results in a 'pending' interrupt, which cannot reach the processor until interrupts from the network adapter are reenabled. When interrupts are reenabled at step 7, the network adapter could immediately interrupt the processor, and processing begins at the beginning of the ISR again (step 1). Reentrancy into the ISR is not a problem at this point, because the only processing remaining in the ISR after step 7 is returning from the ISR. However, no packets are available for processing at step 6 because all of the packets in memory were processed during the first invocation of the ISR. As a result of the pending interrupt, time and processor cycles are wasted by invoking the ISR a second time. The increased processing time spent within the ISR increases the probability that the processor will become interrupt bound, especially in high traffic environments.

The amount of processing time consumed by the ISR upon a single invocation increases as the number of packet resources it must process increases. An excessive number of processor cycles should not be spent during execution of the ISR, because other critical processing may need to be performed (other ISRs, for example).

Another problem arises when the network adapter is unable to interrupt the processor immediately. The network adapter may be unable to interrupt the processor immediately if the processor is executing a section of critical software when the network adapter attempts to interrupt. In critical software, interrupts to the processor are disabled and do not reach the processor until the critical software completes and interrupts are reenabled. During this time, one or several packets may be queued. When the ISR is invoked, it may not have time to process all of the packets which have been written into memory via DMA, or the network software may not be able to accept all of the queued packets. To give other software in the system time to execute on the processor, the ISR resets interrupts and returns quickly without processing all of the available packets. As a result, the remaining data packets are 'orphaned' until the next interrupt arrives. If no other interrupts arrive, the orphaned packets are lost.

It would be desirable to implement an interrupt processing scheme which addresses the problems discussed above. In particular, the interrupt processing should be adaptable to high traffic environments to reduce the number of interrupts generated in such environments, without a loss of data. Furthermore, the interrupt processing should not result in orphaned data, nor should it require the ISR to consume an excessive number of processor cycles on any single invocation.

SUMMARY OF THE INVENTION

A method for reducing the number of interrupts issued by a first device to a second device in a computer system. A delay interval is specified to the first device, the delay interval indicating an amount of time for the first device to wait after receiving data from the second device before issuing an interrupt to the second device. The first device issues the interrupt immediately after receiving the data from the second device when the specified delay is zero. When the delay is non-zero, the first device is scheduled to interrupt the second device after the delay interval expires. If a second unit of data is received from the second device before the delay interval expires, the scheduled interrupt is canceled. Otherwise, the interrupt is issued immediately after the delay interval expires.

DETAILED DESCRIPTION

In the following description, numerous specific details are set forth such as circuits, flow diagrams, etc., in order to provide a thorough understanding of the present invention. In other instances, well-known structures and techniques have not been shown in detail because to do so would obscure the present invention.

The specific arrangements and methods described herein are merely illustrative of the principles of the present invention. Numerous modifications in form and detail may be made by those of ordinary skill in the art without departing from the scope of the present invention. For example, the control and data packets as described in FIG. 1, below, could reside in a memory on a peripheral device rather than in the computer system memory.

The invention involves a mechanism whereby the processor and the interrupting device cooperate to associate multiple data packets with a single interrupt. The invention improves the efficiency of interrupt processing by 1) removing spurious interrupts which may occur even after the associated data has been processed, and 2) delaying the issuance of an interrupt until such time as more data is available for processing.

In the present invention, a software driver executed by the processor recognizes when an interrupt bound situation is occurring. When an interrupt bound situation is detected, the software driver causes the interrupting device to delay subsequent interrupts for a configurable period of time. Separate delays may be associated with interrupts for transmitted packets and received packets.

Figure 1:
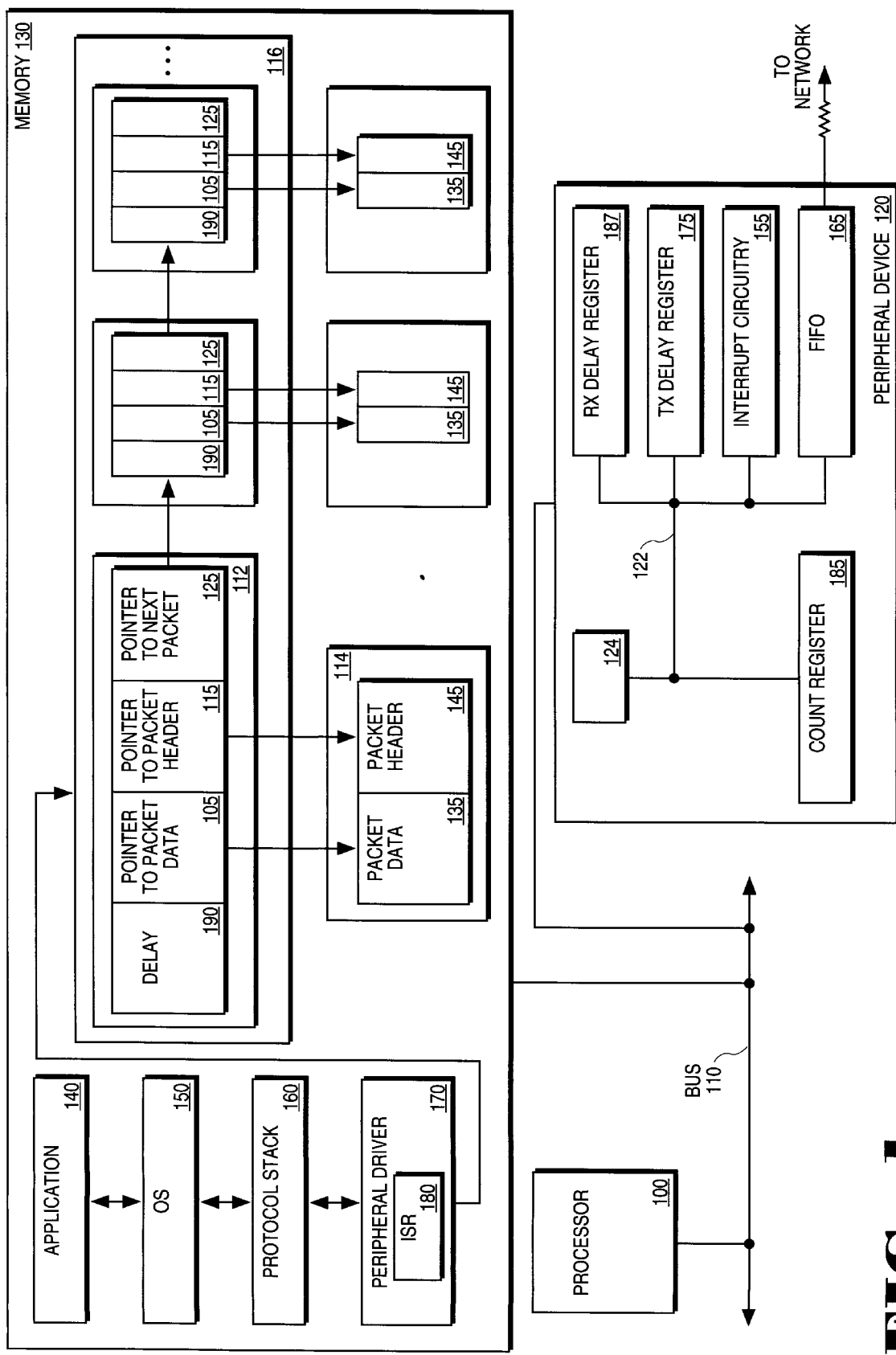
FIG. 1 illustrates one embodiment of a computer system utilizing the invention.

FIG. 1 illustrates a computer system utilizing the invention, which in the illustrated embodiment involves a cooperation of hardware and software for more efficient processing of interrupts. A memory 130 stores instructions for execution by a processor 100 and data for use with the executed instructions. The memory 130 represents one or more mechanisms for storing data. For example, the memory 130 may include machine-readable mediums such as random access memory (RAM), magnetic disk storage mediums, optical storage mediums, flash memory devices, and/or other machine-readable mediums. The memory 130 is coupled to a processor 100 by way of a bus 110. The bus 110 may represent one or more busses (e.g., Peripheral Component Interconnect (PCI) bus, Industry Standard Architecture (ISA) bus, X-Bus, Extended Industry Standard Architecture (EISA) bus, Video Electronics Standard Association (VESA) bus, optical coupling, etc.). The processor 100 represents a central processing unit of any type of architecture, such as Complex Instruction Set Computer (CISC), Reduced Instruction Set Computer (RISC), Very Long Instruction Word (VLIW), or a hybrid architecture. In addition, the processor 100 could be implemented on one or more chips.

Although the present invention is described in terms of a peripheral device and a processor, it applies in general to any apparatus in which a first device interrupts a second device. In general, the second device (receiving the interrupts) is not limited to processors.

Using the bus 110, the processor 100 accesses various elements stored in the memory 130. Typically, the processor 100 contains a decoder for decoding instructions, a register file for storing the operands and results of executing instructions, and an execution unit for executing instructions, as well as other circuits. Such details are unnecessary for an understanding of the invention and are omitted from the figure for clarity. Also omitted from the figure, but common in many computer systems, are a number of user input devices such as a keyboard, a mouse, a display device, and other peripheral components which would typically be coupled to the bus 110.

A peripheral device 120 is coupled to the bus 110 by way of bus interface 124. The peripheral device 120 comprises a count register 185, a transmit delay register 175, interrupt circuitry 155, the bus interface 124, and a FIFO buffer 165. The count register 185, the transmit delay register 175, the interrupt circuitry 155, and the FIFO buffer 165 are each coupled to the bus interface 124 and to each other by way of the internal peripheral bus 122. The FIFO buffer 165 is also coupled to an external network.

The memory 130 contains a software application 140, an operating system 150, a protocol stack 160, a peripheral device driver 170, and a linked list of control packets 116, each control packet referencing a data packet 114. The peripheral driver 170 comprises an interrupt service routine (ISR) 180 for processing interrupts from the peripheral device 120, which is also coupled to the bus 110. The software application 140 communicates with the operating system (OS) software 150 by way of a software interface. Likewise, the OS 150 communicates with protocol stack software 160 via a software interface, and the protocol stack software 160 communicates with the peripheral device driver software 170 by way of a software interface. The details of the communications between the various components listed above are not important to an understanding of the invention.

Each control packet 112 comprises a delay field 190, a pointer 105 to the packet data 135, a pointer 115 to the packet header 145, and a pointer 125 to the next control packet in the linked list of control packets 116. Each data packet 114 comprises a packet header 145 and packet data 135. The pointer to the data packet 105 identifies the memory location of the packet data 135, and is used by both the ISR 180 and the peripheral device 120 for accessing the packet data 135. Likewise, the pointer to the packet header 115 identifies the memory location of the packet header 145, and is used by both the ISR 180 and the peripheral device 120 for accessing the packet header 135. The pointer to the next control packet 125 identifies the memory location of the next control packet in the linked list of control packets 116, and is used to build the linked list of control packets 116 from the individual control packets 112.

The delay field 190 specifies how much time the peripheral device 120 should delay before interrupting the processor 100 once a data packet 114 is queued for transmission. The value in the delay field 190 is typically written into the transmit delay register 175 by the peripheral driver 170, or else it is read into the transmit delay register 175 by the peripheral device 120. The delay field 190 may be set to 0 or any non-zero value. In low traffic environments, the delay field 190 is typically set to 0 by the peripheral driver 170. When the delay field 190 is zero, the peripheral device 120 interrupts the processor immediately using interrupt circuitry 155 after a data packet 114 is queued for transmission (i.e. a normal mode of operation).

The process of transmitting packets begins, for example, when an application 140 wants to transmit a digital file. The data from the file is provided to the protocol stack 160. The protocol stack 160 divides the file into data packets 114. Each packet has a discrete unit of the data 135, and source and destination addresses. The data packet 114 may also contain information (not shown) that allows the receiver to reassemble the data packets into the file at the destination location. The source and destination addresses and the reassembly information are contained in the area of the data packet 114 called the packet header 145.

Each data packet is sent from the protocol stack 160 to the peripheral driver 170. The peripheral driver 170 allocates a control packet 112 in memory for each data packet 114. The control packet 112 comprises pointers to the various parts of the data packet 114, including the packet data 135 and the packet header 145. The peripheral driver 170 notifies the peripheral device 120 that the packet is available, and the peripheral device 120 uses the control packet 112 to access the data packet 114 in memory 130 using direct memory access (DMA). The data packet 114 is then queued for transmission in the First In First Out (FIFO) buffer 165 of peripheral device 120. The peripheral device 120 can of course use means other than DMA to access the data packet 114 information. For example, the control packet 112 could be written directly into local memory on the peripheral device 120.

The peripheral device 120 reads the delay field 190 of the control packet 112 into the transmit delay register 175. In high traffic environments, the delay can be set to a non-zero value, typically 20 to 100 microseconds. After transmitting a data packet 114, the peripheral device 120 waits the specified delay before interrupting the processor 100. Interrupts can be cancelled up until the delay interval expires. Waiting the specified delay before interrupting gives the interrupt service routine (ISR) 180 an opportunity to yield processing to other tasks in the computer system before the interrupt occurs. During the delay interval, more data packets 114 may become available for transmitting. If more packets become available, the pending interrupt is canceled and the additional data packets 114 are queued into the FIFO 165 by the peripheral device 120. Canceling the interrupt delays invocation of the ISR 180, which provides still more time for the processor 100 to perform other operations, including making more data packets 114 available. Yielding more time to the processor increases the probability that the ISR 180 will process multiple data and control packets 112, 114 each time the ISR 180 is invoked. Processing more resources with each invocation of the ISR 180 leads to more efficient interrupt processing, with less probability that the processor 100 will become interrupt bound.

Other forms of storage may be used besides registers for storing the delay interval value. For example, the transmit delay register 175 could be replaced with a random access memory, a flash memory, or another form of storage without departing from the scope of the invention. If the peripheral device 120 were a bus master device, it could access the delay interval value directly from memory 130.

To summarize, when the delay 190 for a data packet 114 is non-zero, the peripheral device 120 delays the issuance of an interrupt after reading the data packet 114 into the FIFO 165. When the delay interval expires, an interrupt is issued by the peripheral device 120 using interrupt circuitry 155 to the processor 100, which invokes the ISR 180 to reclaim the resources associated with the data packet 114 and control packet 112. However, if during the delay interval a second data packet 114 is made available for transmission, then the peripheral device 120 reads the second data packet into the FIFO 165 and no interrupt is issued by the peripheral device 120 for the first data packet 114. If a non-zero delay value 190 is specified for the second data packet, the peripheral device 120 reschedules the interrupt to occur after the delay interval specified with the second data packet.

If a third data packet is made available before the second delay interval expires, the pending interrupt is once again canceled and the peripheral device 120 queues the third packet, and so on.

At some point during the transmission of data packets 114, one of two things can happen: 1) no more packets are made available before the delay interval expires (the end of a high traffic burst), or 2) the delay interval for a packet is set to 0 (The resources in the linked list of control packets 116 are exhausted.). If no more packets are made available before the delay interval expires (situation #1), then the interrupt is issued by the peripheral device 120 after the delay interval 190 expires. The ISR 180 is then invoked to process the resources of all data and control packets 114, 112 which were queued (read into the FIFO 165) by the peripheral device 120. (More typically, the ISR 180 will only process a predetermined maximum number of resources at a time to limit the processing cycles spent within the ISR 180). If the delay interval 190 is set to zero (situation #2), then the peripheral device 120 issues the interrupt immediately after queuing the data packet 114 into the FIFO 165. The ISR 180 is then invoked, and it processes the resources of all packets which were queued into the FIFO (again, up to a predetermined maximum).

Delaying the interrupt increases the probability that subsequent packets will be made available for queuing into the FIFO 165. Increasing the probability that subsequent packets will be made available for queuing increases the probability that the preceding interrupts to the processor 100 will be canceled because of the availability of the additional packets. Increasing the probability that an interrupt will be canceled reduces, on average, the number of interrupts which are issued. Reducing the number of interrupts issued to the processor 100 reduces the number of times the ISR 180 is invoked, which reduces the average ISR overhead in the system. Reducing the average ISR overhead reduces the probability that the processor 100 will become interrupt bound.

To restate, by specifying a delay 190 before issuing the interrupt, the number of interrupts tends to be reduced, especially in high traffic environments. Reducing the number of interrupts reduces the number of processor cycles consumed by the ISR on average, which reduces the probability that the processor will become interrupt bound.

To limit the number of processor cycles consumed by the ISR 180 on any single invocation, an upper bound is typically placed on the number of packet resources which the ISR 180 will process on any single invocation. For example, the ISR 180 may be limited to processing the resources of four packets upon any single invocation. If the resources of five packets are available for processing, the ISR 180 will process four of them upon a first invocation, yield control of the processor 100, and then process the resources of the fifth packet upon a second invocation. The resources of the fifth packet will be reclaimed when the ISR 180 is once again invoked (or when the ISR 180 is shut down). Note that the data associated with the fifth packet is not "orphaned", because the data has already been queued for transmission. It is merely the resources associated with the fifth packet which are waiting to be reclaimed. No data is lost.

The previous discussion concerned how the invention reduces the number of interrupts issued when transmitting packets from the computer system to the network. The invention can also be used to reduce the number of interrupts issued for packets received by the computer system from the network. To reduce the number of interrupts issued for received packets, the peripheral device 120 keeps a count in a count register 185 which is incremented every time a packet is received from the network. Using DMA, the peripheral device 120 writes the received data packet 114 to the memory location in memory 130 defined by an associated control packet 112.

The ISR 180 processes the one or more packets in memory 130, then writes to the count register 185 to decrement the count by the number of processed packets. If the count is zero after this last operation, the peripheral device 120 will not attempt to interrupt the processor 100 again. However, if the count is non-zero (indicating that the ISR 180 was unable to process all of the received packets in memory 130), the peripheral device 120 interrupts the processor 100 again after the expiration of a delay interval specified in receive delay register 187. In this manner, control of the processor is yielded by the ISR 180 for the period of the delay interval, and multiple packets are processed on average with each invocation of the ISR 180. No packets are orphaned because of the subsequent interrupt when the count is non-zero. Using separate registers to store the delay and transmit delay values enables bidirectional data transfer with reduced interrupt processing for both transmitting and receiving data.

In one embodiment, the value of the delay in the receive delay register 187 is set once by the peripheral driver 170 when the driver is first loaded into memory 130 and initialized, before any data is received. In another embodiment, the peripheral driver 170 dynamically adjusts the value of the delay in the receive delay register 187 to dynamically optimize interrupt processing.

In one embodiment, the control structure 112 contains 5 bits for specifying the delay 190. There are therefore 32 possible delay values. In one embodiment, the delay value can be specified with 100 microseconds of precision.

Other embodiments are possible without departing from the scope of the invention. For example, the peripheral device 120 could be an integral part of the computer system motherboard, or it could interface with the computer system through a port mechanism, such as a serial or parallel port. Furthermore, although illustrated in the context of a network, the peripheral device 120 need not be connected to a network. Rather, it could be any peripheral device which is a source or sink of data, such as for example a video capture board, a sound board, or a CD ROM player. In addition, other forms of storage may be used for storing the delay interval value besides registers. For example, the transmit delay register 175 could be replaced with a random access memory, a flash memory, or another form of storage without departing from the scope of the invention. If the peripheral device 120 were a bus mastering device, it could access the delay interval value directly from memory 130.

Figure 2:
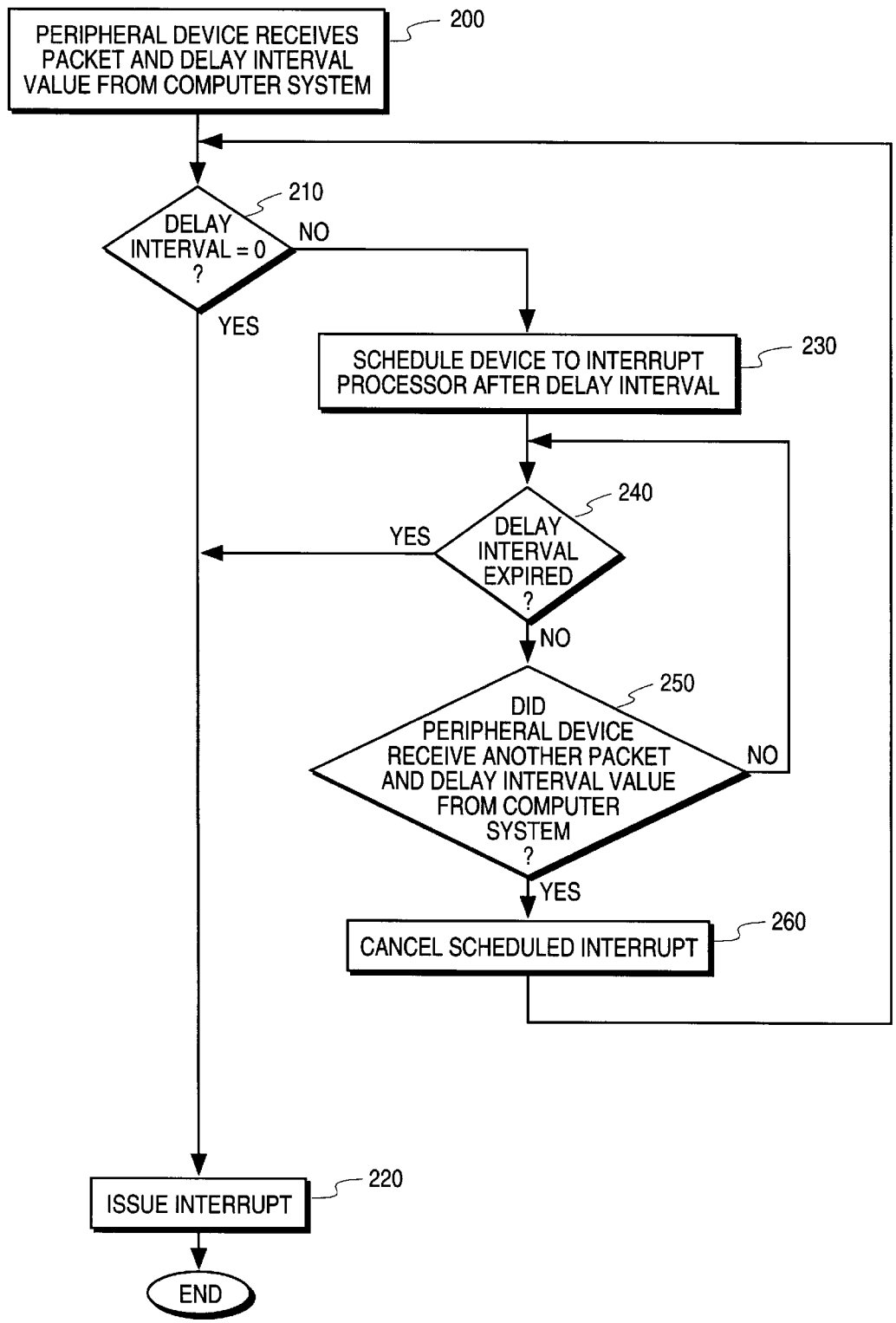
FIG. 2 illustrates a method for interrupt processing when data is received by a peripheral device from a computer system.

FIG. 2 illustrates a method for more efficient interrupt processing when data is transmitted from a computer system to a peripheral device. At step 200 the peripheral device receives a data packet and a delay interval from the computer system. The peripheral device will typically transmit the data packet over a network or perform other processing on the data. The delay interval is used by the peripheral device as explained below. At step 210 a test is made by the peripheral device to determine if the delay interval is zero. If the delay interval is zero the peripheral device issues an interrupt to the processor of the computer system at step 220. If the delay interval is not zero, the device schedules an interrupt to the processor to occur after the delay interval at step 230.

After scheduling the device to interrupt the processor after the delay interval expires, the device tests whether the delay interval has expired at step 240. If the delay interval has expired, the interrupt is issued at step 220. If the delay interval has not expired, then a test is made to determine if the peripheral device received more data and another delay interval value from the computer system at step 250.

If more data and another delay value is received from the computer system before the first delay interval has expired, the scheduled interrupt is canceled at step 260. If more data and another delay value is not received from the computer system before the first delay interval has expired, then the test of whether the delay interval is expired is again made at step 240. After canceling the scheduled interrupt, the processing returns to step 210 to check if the new delay interval is equal to zero.

Other embodiments are possible without departing from the scope of the invention. For example, the comparison step 210 might test whether the delay is greater than zero (as opposed to checking for equality with zero) and issue the interrupt when the test is FALSE, and schedule the interrupt otherwise.

Figure 3:
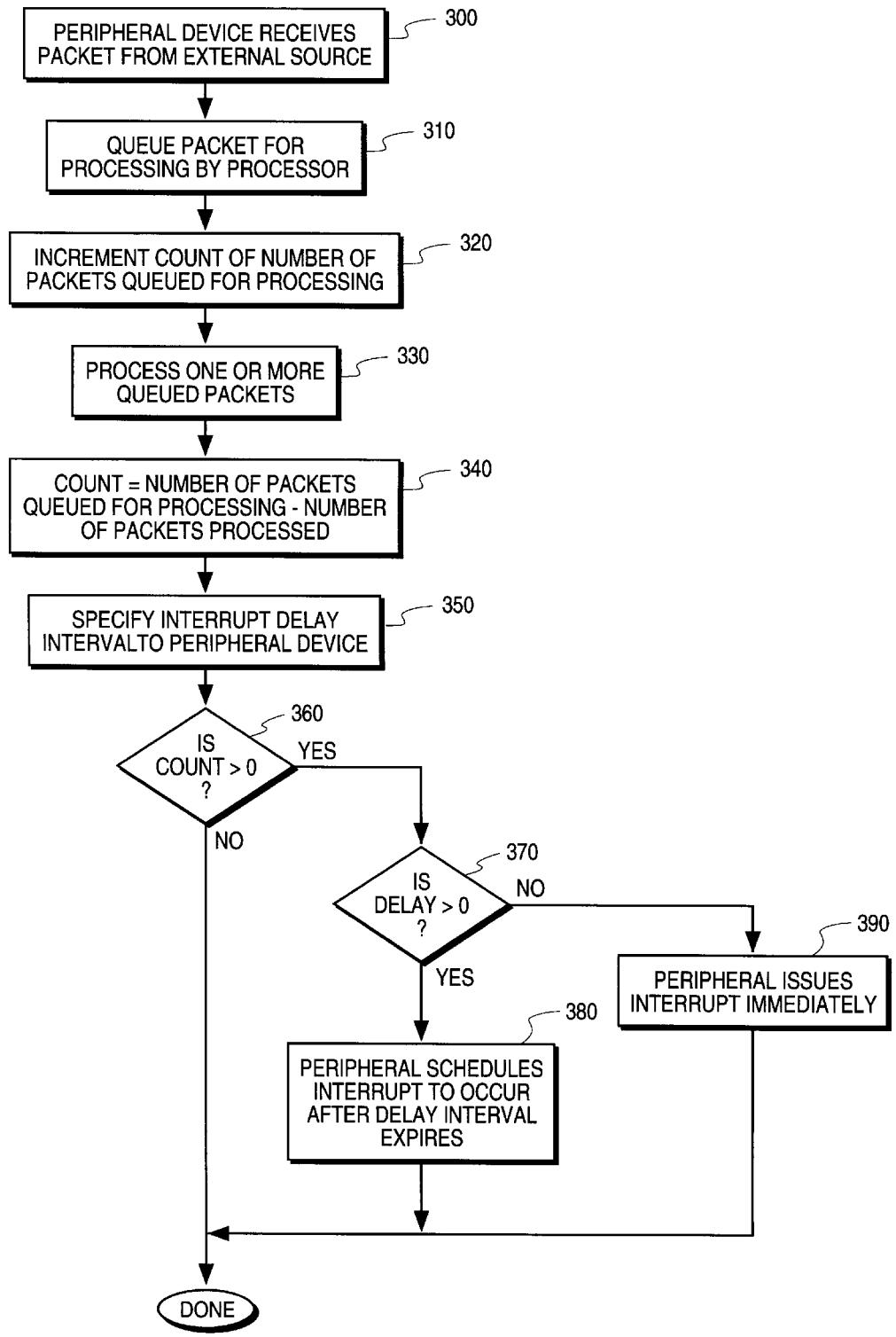
FIG. 3 illustrates a method for interrupt processing when a peripheral device receives packets from an external source.

While FIG. 2 illustrates a method for transmitting packets, FIG. 3 illustrates a method for efficient interrupt processing when a peripheral device receives packets from an external source, such as a network, a video capture board, or any other type of data-producing external source. At step 300 the peripheral device receives data from the external source. The data is queued for processing at step 310, for example by creating a control packet 112 in the linked list 116, and a data packet 114 referenced by the control packet 112, as in FIG. 1. After queuing the received packet, the count of the number of packets for processing is incremented at step 320.

One or more packets are then processed by the computer system at step 330. After processing the one or more queued packets, a count is set equal to the difference between the number of packets queued for processing and the number of packets processed at step 340. A delay interval (to be used in a manner described below) is then specified to the peripheral device at step 350. After the delay interval is specified, a test is performed to determine whether the count computed in step 340 is greater than zero. If it is, a second test is made to determine if the delay is also greater than zero at step 370. If the count is not greater than zero, then the interrupt is suppressed and the processing concludes. If the specified delay is greater than zero, the peripheral device schedules the interrupt to occur after the delay interval expires at step 380. If the specified delay is not greater than zero, then the peripheral device issues the interrupt immediately at step 390.

Other embodiments are possible without departing from the scope of the invention. For example, at step 360 the comparison could test whether the count was zero (as opposed to testing for greater than zero). If the count was zero, the processing would conclude. Otherwise, step 370 would be carried out in which the delay value is tested. If the delay value is zero (as opposed to greater-than-zero), and if the delay value is zero, the interrupt could be issued immediately. Otherwise, step 380 would be carried out.

The following situations demonstrate the use of the invention to receive data packets from a network, utilizing the method illustrated in FIG. 3. In all situations, the count of the number of packets queued for processing is initially zero.

In the first situation, the peripheral device receives a packet from the network. The packet is transferred into memory using DMA, the peripheral device interrupts the processor, and the count of the number of packets queued for processing is incremented by one. The ISR is invoked by the interrupt, processes the single packet from memory, and decrements the count by one. The count is once again zero, all queued packets have been processed, and the peripheral device does not interrupt the processor a second time.

In the second situation, the peripheral device receives a packet from the network, increments the count, and interrupts the processor. However, the ISR is not invoked right away because the processor is executing a critical section of software and interrupts are disabled from reaching the processor until the critical section ends. When the critical section ends, the ISR is immediately invoked. By this time a second packet has arrived, been queued, and the count incremented. The peripheral device attempts to interrupt the processor a second time, but because the first interrupt has not yet been serviced, the second interrupt is discarded. The ISR processed both queued packets and decrements the count by two. The count is once again zero, all queued packets have been processed, and the peripheral device does not interrupt the processor a second time.

The third situation is similar to the second one, in which the peripheral device receives a packet, increments the count, and interrupts, but the ISR is not invoked right away because the processor is executing a critical section of software (interrupts are disabled). By the time the critical section ends and the ISR is invoked, X packets have been queued by the peripheral device, where X is a relatively large number (say, 10). All interrupts except the first one are discarded. Such a situation corresponds to a high traffic environment, where a great many packets may be received in a short period of time. As discussed above, the ISR may be limited in the number of packets it can process in any single invocation, due to requirements that the ISR finish processing quickly and yield control of the processor to other software in the computer system. Another reason the ISR may be limited in the number of packets it can process is because the protocol stack 160 can only accept a limited number of packets. Thus, the ISR may process only N packets, where N is less than X. The ISR then sets the count to X-N and returns. The peripheral device detects that the count X-N is greater than zero and schedules an interrupt to occur after the delay interval specified by the value in the transmit delay register 175 expires. Upon expiration of the delay interval, the peripheral device interrupts the processor again, and the ISR is invoked a second time. Upon this second invocation, the ISR processes the remaining X-N packets (assuming no additional packets have arrived in the interim) and decrements the count by X-N. The count is once again zero, and the peripheral device does not generate any more interrupts. None of the received packets are orphaned.

Although this invention has been shown in relation to a particular embodiment, it should not be considered so limited. Rather, the invention is limited only by the scope of the appended claims.

What is claimed is:

1. A method for managing processor interrupts in a computer system, comprising the steps of:

receiving a first data packet from a memory device for transmission;

receiving a first delay value associated with the first data packet from the memory device;

when the first delay value is zero, issuing a processor interrupt;

when the first delay value is not zero, scheduling the issuance of a processor interrupt for after expiration of a period specified by the delay value;

when the first delay value is not zero, determining whether the period specified by the first delay value has expired;

if the period specified by the first delay value has not expired, determining whether a second data packet and a second delay value have been received from the memory device; and if a second data packet and a second delay value have been received from the memory, canceling the scheduled processor interrupt.

2. The method of claim 1, further comprising the steps of:

determining whether the second delay value is zero; and if the second delay value is zero, issuing a processor interrupt.

3. The method of claim 1, further comprising the steps of:

receiving at least one data packet from a source external to the computer system;

queuing the at least one data packet for processing;

maintaining a count of a number of data packets queued that have been processed;

specifying a length of time to delay a processor interrupt to an interrupting device; and if the count is greater than zero and the length of time is zero, issuing a processor interrupt.

4. The method of claim 3, further comprising the step of, if the count is greater than zero and the length of time is greater than zero, scheduling a processor interrupt to occur after the length of time.

* * * * *